United States Patent [19]

Ling et al.

[11] Patent Number: 4,994,898
[45] Date of Patent: Feb. 19, 1991

[54] A COLOR TELEVISION SYSTEM FOR PROCESSING SIGNALS FROM A TELEVISION CAMERA TO PRODUCE A STEREOSCOPIC EFFECT

[75] Inventors: William Ling; Robert J. Taylor; Glynne R. Lancaster, all of London, England

[73] Assignee: Aspex Limited, England

[21] Appl. No.: 318,926

[22] PCT Filed: Jun. 22, 1988

[86] PCT No.: PCT/GB88/00480
§ 371 Date: Mar. 6, 1989
§ 102(e) Date: Mar. 6, 1989

[87] PCT Pub. No.: WO88/10546
PCT Pub. Date: Dec. 29, 1988

[30] Foreign Application Priority Data

Jun. 22, 1987 [GB] United Kingdom ............... 8714548
Feb. 29, 1988 [GB] United Kingdom ............... 8804700
May 24, 1988 [GB] United Kingdom ............... 8812208

[51] Int. Cl.⁵ ........................................ H04N 15/00
[52] U.S. Cl. ........................................ 358/3; 358/105; 358/88
[58] Field of Search ............... 358/3, 88, 89, 91, 92, 358/105

[56] References Cited

U.S. PATENT DOCUMENTS 4,558,359 12/1985 Kuperman et al. ............... 358/89
4,704,627 11/1987 Yuyama et al. .................... 358/3 X
4,743,985 5/1988 Yamada et al. .................... 358/91 X

*Primary Examiner*—Victor R. Kostak
*Attorney, Agent, or Firm*—Kirschstein, Ottinger, Israel & Schiffmiller

[57] ABSTRACT

A color television or video system for processing signals from a television camera, in which a number of different signals corresponding to images of different colors give rise to different color partial images superimposed on the television screen to form a single full color image. The signals are processed so that the partial images superimposed on the screen correspond to images seen by the camera at time separated by predetermined intervals, so that the partial images of an object moving relative to the camera are displaced relative to one another on the television screen to give a stereoscopic effect when the different images are presented to different eyes of the viewer. To give an optimum effect, the displacement of the partial images should be in a direction appropriate to the direction of horizontal movement in the screen. The signals are processed so that, at least over a number of successive fields, the full color images on the television screen include images in which the displacement between different color partial images, or parts thereof, is in a direction appropriate to the predominant horizontal direction of movement in the scene. In one embodiment, the signals are processed so that the full color images consisting of partial images displaced relative to another in direction appropriate respectively to movement from left to right and from right to left in the scene are presented alternately on the television screen, in alternate fields or frames. Other embodiments are described, in which the direction of displacement of the partial images can be switched, under manual or automatic control, in accordance with the predominant horizontal movement in the scene or with the movement of the camera.

16 Claims, 8 Drawing Sheets

| No. OF FIELD ON TV SCREEN | REAL TIME FIELDS FROM WHICH IMAGES ARE TAKEN |
|---|---|
| 1 | RED 1    CYAN 2 |
| 2 | RED 3    CYAN 2 |
| 3 | RED 3    CYAN 4 |
| 4 | RED 5    CYAN 4 |

FIG.5

| REAL TIME FIELD | WRITE FIELD TO STORE | READ FIELD FROM STORE |
|---|---|---|
| 1 | RED 1    RED A | |
| 2 | CYAN 2    CYAN A | |
| 3 | RED 3    RED B | RED 1    RED A<br>CYAN 2    CYAN A |
| 4 | CYAN 4    CYAN B | RED 3    RED B<br>CYAN 2    CYAN A |
| 5 | RED 5    RED C | RED 3    RED B<br>CYAN 4    CYAN B |
| 6 | CYAN 6    CYAN C | RED 5    RED C<br>CYAN 4    CYAN B |
| 7 | RED 7    RED D | RED 5    RED C<br>CYAN 6    CYAN C |
| 8 | CYAN 8    CYAN D | RED 7    RED D<br>CYAN 6    CYAN C |
| 9 | RED 9    RED A | RED 7    RED D<br>CYAN 8    CYAN D |
| 10 | CYAN 10    CYAN A | RED 9    RED A<br>CYAN 8    CYAN D |

FIG.6

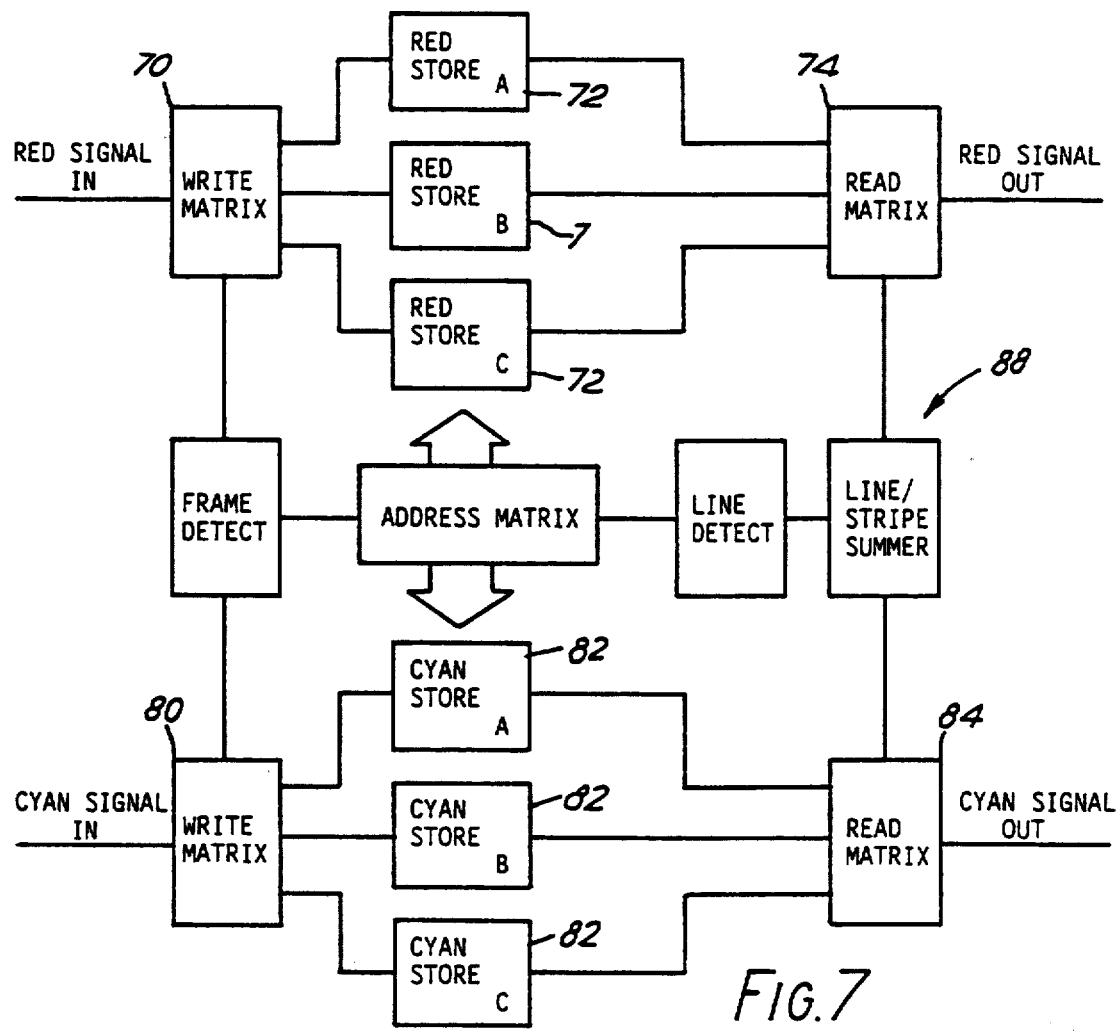

| REAL TIME FRAME | WRITE | STRIP | READ |
|---|---|---|---|
| 1 | RED A    CYAN A | 1<br>2<br>3<br>4<br>5<br>6 | |
| 2 | RED B    CYAN B | 1<br>2<br>3<br>4<br>5<br>6 | |
| 3 | RED C    CYAN C | 1<br>2<br>3<br>4<br>5<br>6 | RED A    CYAN B<br>RED B    CYAN A<br>RED A    CYAN B<br>RED B    CYAN A<br>RED A    CYAN B<br>RED B    CYAN A |
| 4 | RED A    CYAN A | 1<br>2<br>3<br>4<br>5<br>6 | RED B    CYAN C<br>RED C    CYAN B<br>RED B    CYAN C<br>RED C    CYAN B<br>RED B    CYAN C<br>RED C    CYAN B |
| | | ETC ↓ | RED C    CYAN A<br>RED A    CYAN C |

FIG. 9

COLOR TELEVISION SYSTEM FOR PROCESSING SIGNALS FROM A TELEVISION CAMERA TO PRODUCE A STEREOSCOPIC EFFECT

BACKGROUND OF THE INVENTION

1. Field of the Invention

This invention relates to the recording and reproduction of images. More particularly, the invention relates to the recording and reproduction of stereoscopic television or video images.

2. Description of Related Art

Stereoscopic or "3D" photographs and moving films have been known for many years. The photographs or films have been made by simultaneously photographing an object from two different aspects, through two lens systems separated horizontally or vertically from one another or by dividing a single lens system using mirrors, prisms etc. In the case of moving films, the usual technique has been to use different colour filters, for example red and green, with the two lens systems, or split lens system so that red and green images are formed simultaneously on each frame or alternate frames of the film. When the film is subsequently shown in the cinema or through a television transmission system, each member of the audience wears a pair of spectacles with complementarily coloured lenses, so that the two images on the screen are presented separately to the two eyes of the viewer, producing the illusion of a stereoscopic or three dimensional image. Disadvantageous of the known techniques are that they require specially built or specially adapted cameras which, because of the need for split or separate lens systems, are bulky and expensive, and that they produce a degraded or double image when the result is viewed without the appropriate spectacles.

Stereoscopic vision relies on the fact that each eye sees a different aspect of the same object. This stems not only from the different positions occupied by the two eyes, but from the fact that there is usually movement in the scene being viewed, or movement of the eyes themselves. A person's head is for a large part of the time in constant movement, as are the eyes within the head, as they constantly scan the scene they are looking at. This causes continuous change in the aspects of the scene being viewed by each eye, which is important in the perception by the brain of the "dimensionality" of objects in the scene. Any movement in the scene, even of a single moving object, will increase the stereoscopic effect, even if the eyes are kept stationary.

The present invention makes use of this effect in producing stereoscopic images in a television or video system.

Television or video systems use an electronic camera to generate, three electrical signals corresponding to the red, green and blue light from the scene being recorded. These signals are eventually reproduced in the television receiver to give rise to red, blue and green images which are in effect superimposed on the television screen to produce a full colour image. The images are produced in a sequence of "fields"; in a typical television system a field is produced by scanning approximately half the lines of the television picture, the remaining lines being scanned in the next field in a manner known as "interlacing", the two successive fields forming a complete frame of the picture.

There have been proposed systems for producing stereoscopic television or video images, in which the superimposed red, green and blue images on the television screen in each field correspond to images seen by the camera at times separated by predetermined intervals. Examples of such systems are shown in European patent Nos. 0 022 820B and 0 089 611B.

In these systems, the single colour images appearing on the television screen correspond to images of the scene taken at different times. Stereoscopic information about objects in the scene is effectively encoded in the disparity between the single colour images superimposed on the screen. However, this information will be different depending on the direction of movement of an object across the scene. For example, suppose an object is moving from left to right across the scene, and that two successive images are formed in red and cyan light and subsequently superimposed on the screen (a two colour system being considered for the sake of simplicity). From the point of view of the camera, the red image will correspond to the image of the object as seen from a point slightly to the right, as compared with the cyan image, the degree of misalignment or disparity depending on factors such as the speed of movement of the object and its distance from the camera. If the superimposed images are viewed through spectacles so that the red image is presented to the right eye and the cyan image to the left eye of the viewer, then the crossed horizontal disparity between the images will be equivalent to that caused by viewing an object suspended in front of the screen, simultaneously from points spaced to the right and left of a central position, as in normal binocular vision. If one now considers an object moving from right to left across the scene, the right and left eyes will again be presented with different images, but they will now correspond to the uncrossed disparate images of an object behind the screen. Since this is an improbable stimulus in normal binocular vision, it would be expected that no stereoscopic effect, or an incorrect stereoscopic effect, would be observed. Similarly, an object moving vertically in the scene would give rise to vertically disparate images, which would not be expected to give rise to a stereoscopic effect. If the camera undergoes translatory motion while viewing a three-dimensional scene, all objects in the scene, except those at optical infinity, will give rise to disparate images on each frame, the disparity varying appropriately with the distance of the objects from the camera. Camera motion in one direction (right to left) in the system described above) will generate disparities of correct sign, which would give rise to a strong stereoscopic sensation for the entire scene when the image is subsequently viewed. Camera motion in the opposite direction will reverse the sign of all disparities, which might be expected to produce a reversed stereoscopic sensation.

It has been found that reversed stereopsis rarely if ever occurs and the stereoscopic sensation is appropriate in direction whatever the motion of object or camera. It appears that the strong monocular cues (e.g. linear perspective, relative size, motion parallax) determine the depth impression of the picture and any horizontal disparities in the image can enhance but not override the depth sensation.

SUMMARY OF THE INVENTION

This invention consists in a colour television or video system for processing signals from a television camera, in which a number of different signals corresponding to images of different colours give rise to different colour partial images superimposed on the television screen to form a single full colour image, in which the signals are processed so that the partial images superimposed on the screen correspond to images seen by the camera at times separated by predetermined intervals, so that the partial images of an object moving relative to the camera are displaced relative to one another on the television screen to give a stereoscopic effect when the different images are presented to different eyes of the viewer, characterized in that means are provided for processing the signals so that, at least over a number of successive fields, the full colour images on the television screen include images in which the displacement between different colour partial images, or parts thereof, is in a direction appropriate to the predominant horizontal direction of movement in the scene.

The information may be provided respectively in alternate fields or frames of the television picture. For example, in a two colour system employing, say, red and cyan images, one field (or frame) of the picture appearing on the screen may consist of a red image superimposed on an earlier cyan image whilst the subsequent field (or frame) consists of a cyan image superimposed on an earlier red image. This may be done by storing the original colour signals field by field (or frame by frame) in an appropriate number of stores, and reading the fields from the stores in an appropriate sequence.

In another form of the invention, the television picture is divided horizontally into a number of strips, each strip consisting of one or more lines of the picture, and the stereoscopic information appropriate to the two directions of horizontal movement is provided alternately in alternate strips. In this way, both sets of information are presented in each field of the television picture. In this form of the invention, the original colour signals can be stored strip by strip, or line by line, in appropriate stores, and read over in an appropriate sequence. In accordance with another aspect of the present invention, there are provided further control means operable in response to a manual input, such as the setting of a manually operated switch, to set the processing means so that the displacement of the different colour partial images superimposed on the television screens is appropriate to a selected horizontal direction of movement of an object relative to the camera.

Preferably, there are provided means to receive the signals and to analyse the signals to establish the predominant direction of horizontal movement in the scene, and to control the processing means so that the displacement of the different colour partial images is appropriate to the predominant direction of movement.

The system may include means for controlling the degree of displacement between the different colour partial images in accordance with the horizontal speed of movement of an object in the scene.

In accordance with a further aspect of the invention, the system includes a video camera provided with a sensor for detecting the direction and/or speed of horizontal movement of the camera and for controlling the direction and/or degree of displacement of the different colour partial images in accordance with the direction and/or speed of movement detected.

Instead of employing digital stores for the colour signals, other forms of delay means may be used. For example, solid state charge coupled devices may be used, the devices being clocked from a reference oscillator whose frequency is determined by the delay required.

Alternatively delay lines, to delay the transmission of the signal by the required amount, may be inserted into the path of the colour signals to be delayed. For example, inductive/capacitative transmission lines of appropriate length may be used. Mechanical delay lines may be provided, each consisting of a suitable transducer driven from one of the colour signals and producing mechanical vibrations in a suitable medium, which are reconverted to electrical signals by a further transducer, the distance between the transducers being of such a length as to give the required delay. Similarly, accoustic delay lines may be provided, each consisting of a transducer generating sonic or ultrasonic vibrations which are transmitted through a medium of appropriate length and reconverted to electrical signals by a further transducer. Solid state delay lines may be provided, involving digitizing the colour signal into a number of bits per second which are then fed to shift registers and clocked through the appropriate number of registers to give the required delay, the delayed output of the shift registers being reconverted to analogue form if required.

Each of the delay means referred to can be introduced into the paths of the electrical signals at any suitable point at which the colour signals are separated, in the camera, between the camera and transmitting aerial, between the receiving ariel and the television receiver, between the camera and video recorder or between the reproducing apparatus and television display.

A further method of introducing the required delay involves recording the three colour signals on a suitable medium, and then reading the signals from the tape in such a manner that the required delay is introduced into two of the signals. This might be done, for example, by recording the three signals on three separate tracks of a video tape and providing for the three write heads on the recorder, or the three read heads on the reproducing apparatus to be positioned at different points along the path of the video tape to give the required delays.

Yet another form of the invention is applicable to systems in which the colour signals are generated by imaging elements responsive to red, green and blue light, for example the imaging elements in a conventional television camera, which are activated by signals from a scan generator scanning the array once for each frame. In accordance with this form of the invention, the actuation of the imaging elements is modified to give the required delays to the appropriate colour signals.

In one embodiment of this form of the invention, a scan generator is operated at three times the viewing scan frequency and the signals from the scan generator are supplied to the imaging elements through switches operated so that all the imaging elements in the array responsive to red light are scanned first, then all the elements responsive to green light, then all the elements responsive to blue light. The signals from the imaging elements are digitized and stored. After one complete standard frame, the stores are read at normal scan frequency, and the output, converted to analogue signals, are encoded to form the composite video signal. In this way, each frame reproduced on the television screen will consist of superimposed red, green and blue images sampled at different times by the camera.

In another embodiment of this form of the invention, the signals from the scan generator to the imaging elements corresponding to at least two of the colours are delayed by the required delays. Corresponding delays are applied to the appropriate output signals from the imaging elements, so that the output signals are in register when they are supplied to the encoder producing the composite video. For example, the signals from the scan generator to the imaging elements responsive to green light may be delayed by an interval 2 T, the signals to the imaging elements responsive to blue light being delayed by T and the signals to the imaging elements responsive to red light being undelayed. To bring the output signals of the imaging elements into register, the signal from the red elements would then be delayed by 2 T, the signals from the blue elements being delayed by T and the signal from the green elements not being delayed. With this embodiment of the invention, it is not necessary for the delay to be equal to the interval between successive fields or multiple of that interval.

In a further embodiment of this form of the invention, the light falling on the imaging elements responsive to red, green and blue light is interrupted so that light falls onto the three elements in sequence. This may be done, for example, by dividing the light from the camera lens system so that it falls onto three separate arrays of imaging elements, and interposing a suitably shaped rotatable or reciprocable shutter in the light path to each array, the shutters being driven, for example by stepping motors, in synchronism with the field signals, so that light is supplied sequentially to the three arrays of imaging elements.

In this embodiment, the sequence of red, green and blue images can be reversed in every other frame, in accordance with the invention.

In use of the invention, in any of the forms described above, the image appearing on the television screen will consist in effect of a combination of three single colour images, taken at times separated by short intervals. Any movement of an object in the scene, or of the camera, will give rise to a difference in the images. If the screen is viewed through a pair of spectacles, each lens of which comprises a filter allowing transmission of light corresponding to a colour complementary to a different one of the three colours of the images and a proportion of light corresponding to a colour complementary to the third of the three colours, the differences in the images will give rise to a stereoscopic effect.

Movement of an object in the scene or of the camera will give rise to the appearance of "fringes" around the image on the television screen, because of the differences in the three colour images. It may be possible to reduce the fringing effect to such an extent that the television can be viewed without spectacles, without any noticeable deterioration of the image, whilst the stereoscopic effect is maintained when the screen is viewed through spectacles. The intensity of the fringes may be controlled, for example, by mixing the delayed colour signals with real time colour signals.

The various forms of the invention described above can be applied to television systems using analogue, digital or pulse coded signals.

BRIEF DESCRIPTION OF THE DRAWINGS

The invention will now be described, by way of example, with reference to the accompanying drawings in which:

FIG. 5 illustrates the superposition of coloured images in the system of FIG. 4, FIG. 6 illustrates the sequence of writing and reading from the stores of the system of FIG. 4, FIG. 7 is a block diagram of part of a television system in accordance with another embodiment of the invention, FIG. 8 illustrates the superposition of coloured images in the system of FIG. 7, FIG. 9 illustrates the sequence of writing to and reading from the stores of the system of FIG. 7.

DETAILED DESCRIPTION OF THE PREFERRED EMBODIMENTS

Figure 1:
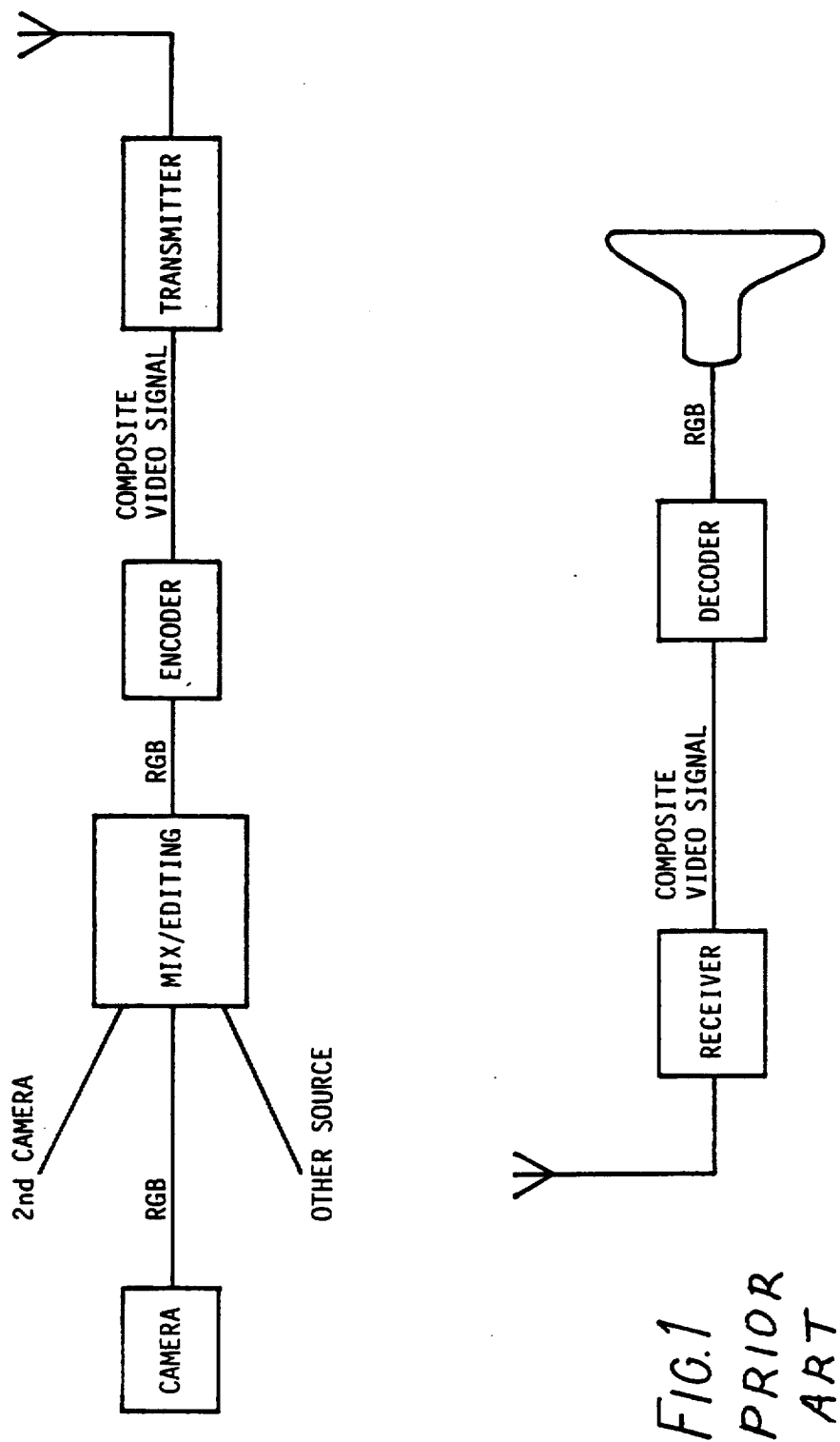
FIG. 1 is a schematic illustration of a conventional colour television system according to the prior art.

FIG. 1 illustrates schematically a conventional colour television system according to the prior art. Imaging elements in the camera responsive to red, blue and green light from the scene being shot produce three corresponding electrical signals which are combined to form a single composite video signal. This signal may be modified, for example by editing and combining it with signals from other sources, before it is supplied to the transmitter. The transmitted signal is received by a suitable aerial and the composite video signal is decoded, for example in a domestic television receiver, to produce the three colour signals which are supplied to cathode ray tubes to produce the final image on the television screen. Instead of supplying the composite video signal direct to the transmitter, it may be recorded on tape, which can be used to transmit the signal, or can form the basis of video cassettes sold commercially for use with domestic video recorders which reproduce the composite video signal and supply it to the television receiver.

Television pictures are usually transmitted (within the U.K.) at 50 fields per second, successive pairs of fields being interlaced to give 25 complete frames per second. The three colour signals give rise in the television receiver to red, blue and green images which are in effect superimposed on the television screen.

Figure 2:
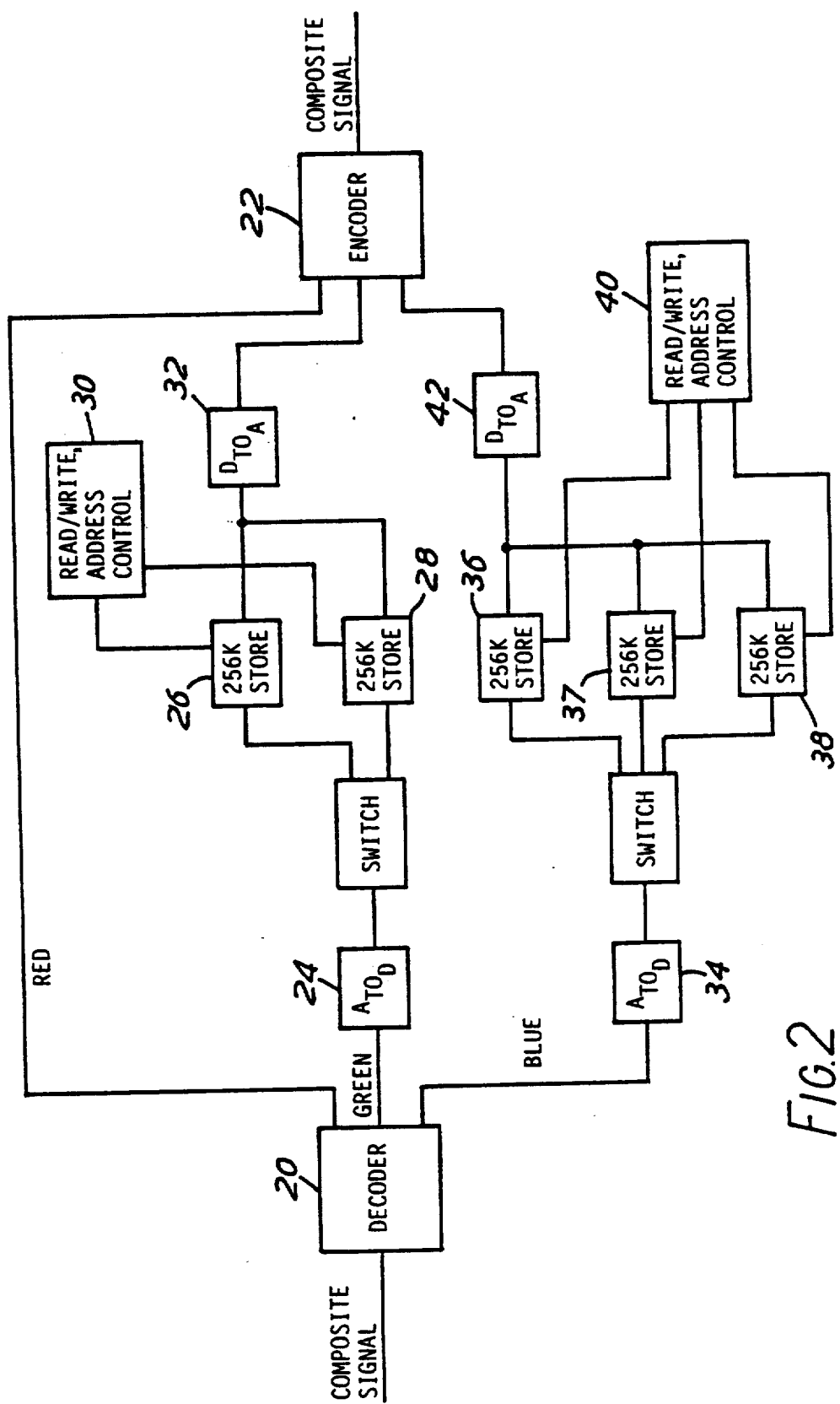
FIG. 2 is a block diagram of part of a television system illustrating the principle of introducing a delay into one or more of the colour signals.

FIG. 2 shows a circuit which can be employed to delay two of the colour signals, in this case the green and blue signals. The composite video signal is decoded by decoder 20 into the three colour signals. The colour signals, after the green and blue signals have passed through delay circuits, are recombined by encoder 22 to form an output composite video signal. The delay circuit for the green signal consists of an analogue to digital converter 24, and two digital stores 26 and 28, each of which can store the digitized green signal corresponding to one field. The fields are supplied alternately by the two stores, and each field is stored for 1/50th second before being supplied, under the control of read/write circuit 30, to the encoder through digital to analogue converter 32. The delay circuit for the blue signal is similar, except that each field is delayed for 2×1/50 second so that three stores are required. The green signal corresponding to each field is supplied through analogue to digital converter 34, in sequence to stores 36, 37 and 38, and each stored signal is outputted, under the control of read/write circuit 40, after the predetermined delay to the encoder 22 through digital to analogue converter 42.

Figure 3:
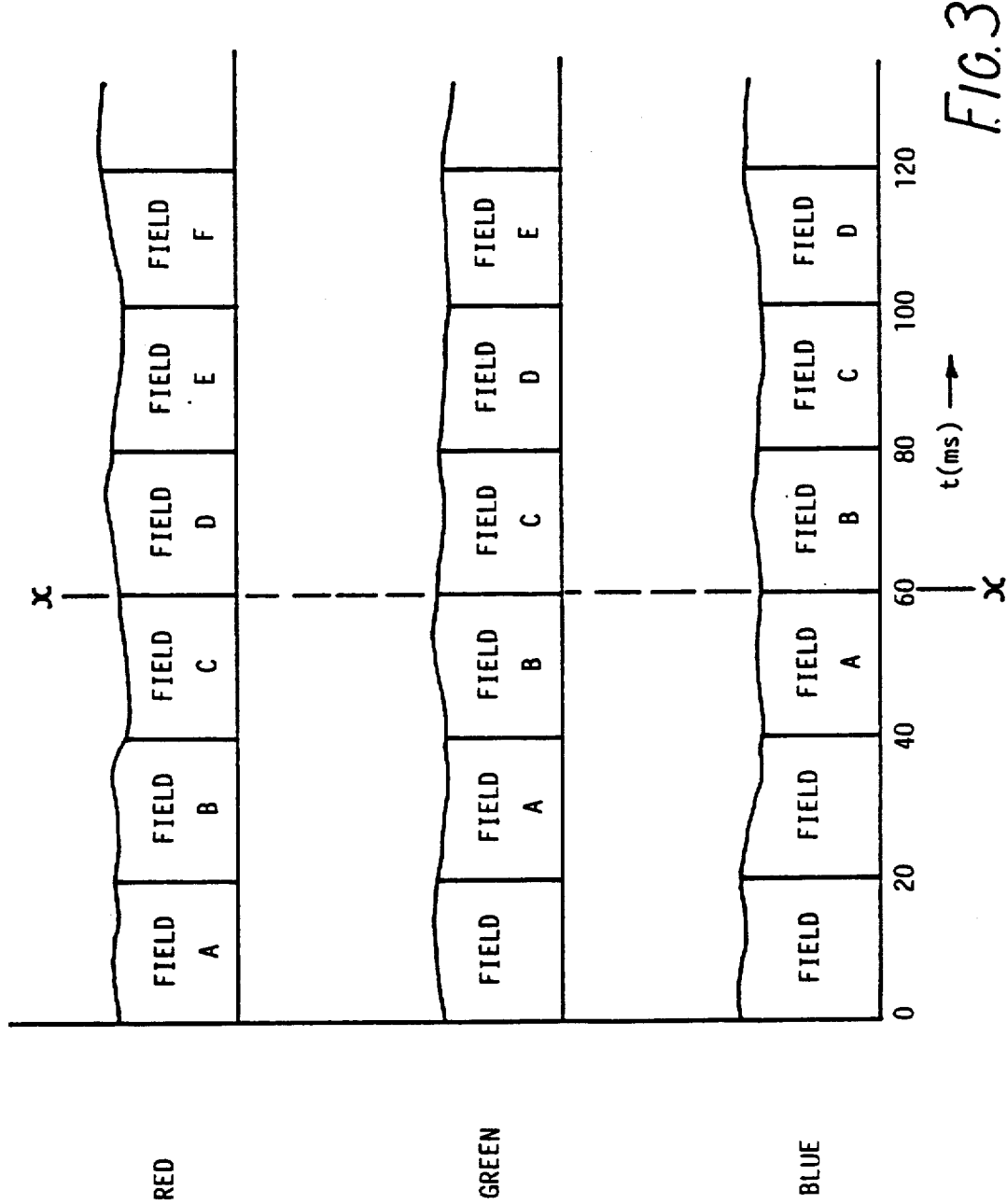
FIG. 3 illustrates the superposition of the three colour images in use of the system of FIG. 2.

FIG. 3 illustrates a series of successive fields (A,B,C,D . . . ) in each of the three colours. It will be seen that the effect of delaying the green and blue signals is that, for example, at time X, the composite video signal consists of frame A in blue, frame B in green and frame C in red. The image appearing on the television screen after decoding the composite video signal will therefore in effect consist of the superimposition of red, green and blue images of the scene at intervals separated by 1/50 second.

The circuit shown in FIG. 2 can be inserted at any suitable point in the path from the television camera to the television receiver or display. For example, the circuit can be interposed between the camera and the transmitting aerial, so that the "stereoscopic" image can be received on conventional television receiving equipment. Alternatively, the circuit can be incorporated in television receiving equipment, so that conventionally broadcast programmes can be viewed stereoscopically. The circuit of FIG. 2 could also be interposed between the camera and video tape recording equipment, to enable the production of video cassettes which can be used with conventional domestic video recorders.

Figure 4:
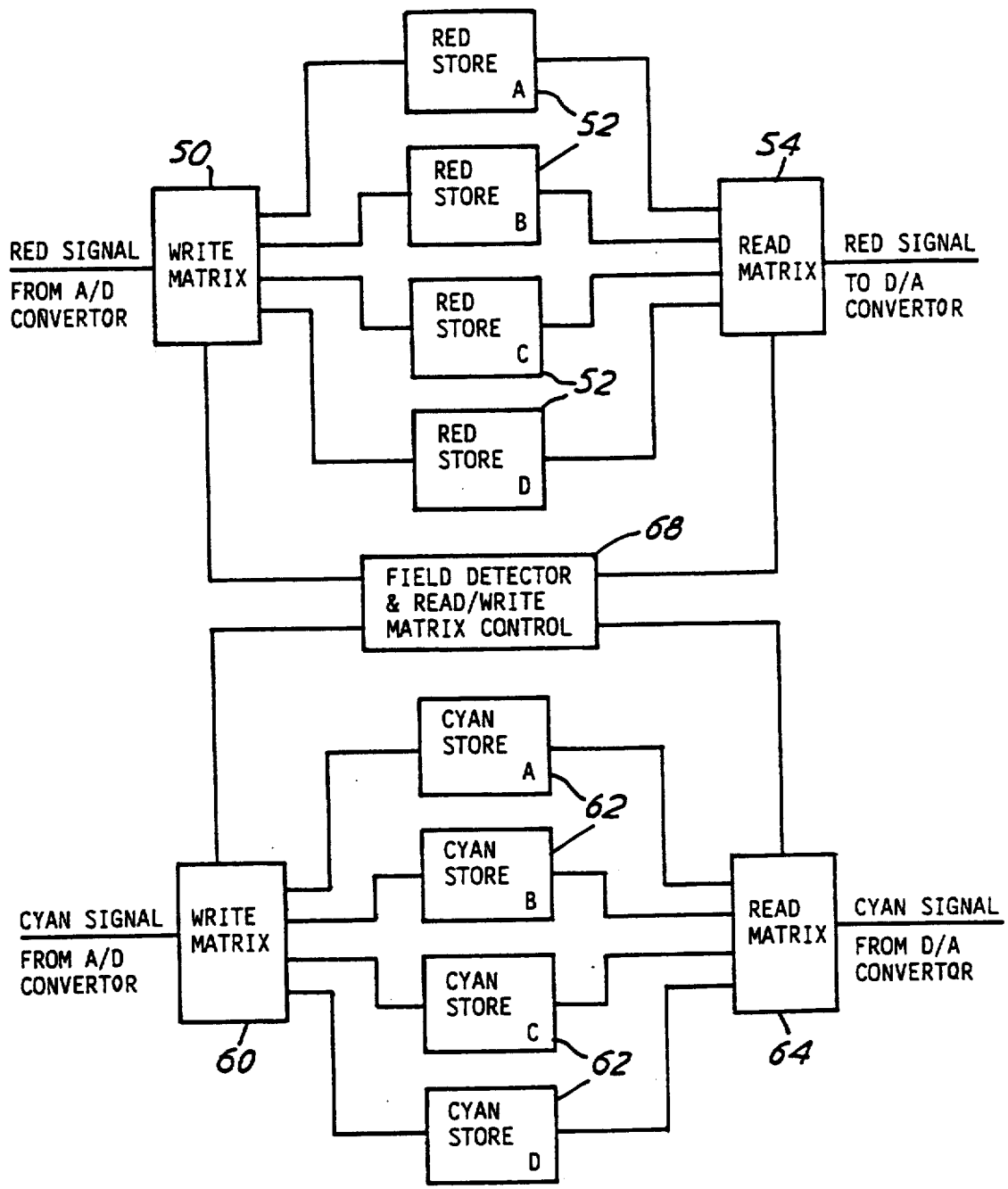
FIG. 4 is a block diagram of part of a television system in accordance with the present invention.

As described above, it is desirable to include in the picture appearing on the television screen stereoscopic information which is appropriate both for objects moving from left to right as well as for objects moving from right to left in the scene. FIGS. 4 to 6 illustrate a system in which the stereoscopic information appropriate to the two directions is presented in alternate fields or alternate frames of the television picture.

The system described is a two colour system, employing, for the sake of example, red and cyan images. To simplify the drawings, only one set of components is shown for the "cyan" signal. In practice, the cyan signal would consist of the green and blue video signals, following parallel paths, with separate components to handle the two signals.

The table shown in FIG. 5 illustrates one possible sequence of images to give the required effect. The successive fields of the original red and cyan video signals (the "real time" fields) are numbered 1, 2, 3 etc. In the right hand column "red 1", for example, indicates the red image taken from real time field 1, and "cyan 2" indicates the cyan image taken from real time field 2. The table shows the images which make up each successive field (numbered 1, 2, 3 etc. in the left hand column) appearing on the television screen. Thus the first field appearing on the screen is made up of a red image taken from real time field 1 and a cyan image taken from real time field 2. The second field appearing on the screen is made up of a cyan image from real time field 2 and a red image from real time field 3. This means that in the first field appearing on the screen the cyan image is of the scene at a later time than the red image, whereas in the second field appearing on the screen the cyan image is of the scene at an earlier time than the red image. The two fields appearing on the screen therefore contain stereoscopic information appropriate to both directions of horizontal movement in the scene. It will be appreciated that the sequence continues, with information appropriate to the two directions being presented in alternate fields.

FIG. 4 illustrates one form of circuit which can be used to carry out the sequence of operations. The digitised red video signal is supplied via write matrix 50 to one of four digital stores 52a, 52b, 52c, 52d, from which the stored signals can be read out via read matrix 54 and supplied through a digital to analogue converter to be recombined with the cyan signal into a composite video signal, as in the previously described embodiment. The digitised cyan signal is similarly supplied via write matrix 60 to one of four stores 62a, 62b, 62c, 62d, from which the stored signals can be read out via read matrix 64. Writing to and reading from the stores 52 and 62 is controlled by circuit 68. FIG. 6 illustrates the read and write sequence for the circuit, to effect the sequence of fields shown in FIG. 5.

One disadvantage of this embodiment of the invention is that some of the information in the original signals is lost. In particular, the red images from the even-numbered real time fields and the cyan images from the odd-numbered real time fields are lost, and alternate red and cyan images are using in two successive fields on the television screen. This may give rise to undesirable images on the screen. It may be possible to reduce or eliminate any such undesirable effects, for example by combining part of the original video signal with the signal processed by the circuit of the invention. Alternatively, a three colour could be employed, for example with the blue signal left unaltered and the red and green signals processed in a manner similar to the described processing of the red and cyan signals. Instead of changing the sequence of the colour signals in alternate fields, the sequence could be changed in alternate frames.

FIGS. 7 to 9 illustrate another form of the invention, in which the stereoscopic information appropriate to both directions of horizontal movement in the scene is provided in the same field, by dividing the image to be reproduced on the television screen into a number of horizontal strips, each strip consisting of one or more lines of the television picture, and providing the alternate stereoscopic information in alternate strips.

For example, in a two colour system using red and cyan signals, one strip may consist of part of the red image from one field (or frame) and part of the cyan image from a previous field (or frame), whilst the next strip consists of part of the cyan image from the same field (or frame) and part of the red image from the previous field (or frame), and so on for the remaining strips. This is illustrated in the table shown in FIG. 8, which shows the source of the red and cyan images for each of six strips forming the television picture, the images being derived from one of two successive fields, numbered 1 and 2.

FIG. 7 shows one form of circuit for carrying out this sequence. The digitized red signal is supplied via write matrix 70 to stores 72a, 72b and 72c, from which the signals can be read via read matrix 74. The digitized cyan signal is similarly supplied via write matrix 80 to stores 82a, 82b, 82c, from which the signals can be read out via read matrix 84. Writing to and reading from the stores is controlled by circuitry which synchronizes the operations with the signals controlling the display of lines and fields on the television screen. FIG. 9 illustrates the sequence in which the strips are read from the stores for display on the television screen.

Where each strip consists of a number of lines, it will be necessary to control the sequence in which the lines making up the strip are read from the stores. For example in forming a strip with information from red store A and cyan store B, it will be necessary to read information from red store A and cyan store B in sequence for each line of the strip.

Alternatively, each strip could consist of a single line, the stereoscopic information alternating from line to line.

It may also be possible to provide the alternate information within each line, for example by treating each line as being made up of two separate "strips", extending from opposite edges of the screen to the center of the screen.

The systems shown in FIGS. 4 and 7 could be inserted at any suitable point in the path from the television camera to the television receiver, as with the circuit of FIG. 2.

Instead of providing information appropriate to the direction of horizontal movement in each frame, or each field, of the picture, the system of the invention could be modified to enable the information provided in each frame or field to be appropriate to the overall direction of movement in the scene or the direction of movement of a principal object in the scene. This may be done, in accordance with another aspect of this invention, by controlling, either automatically or through the intervention of an operator, the sequence of the different colour images which are ultimately superimposed on the television screen.

Where the invention is carried out by introducing a delay into one or more of the colour video signals, the sequence of images maybe altered by switching the delay from one colour video signal to another. For example, in the system shown in FIG. 2, switches could be inserted at the output of the decoder 20, to enable the red and blue signals to be re-routed so that the delay is introduced into the blue rather than the red signal. Alternatively, all three colour video signals could be digitized and stored, and the sequence in which the signals are read out from the stores could be controlled in accordance with the direction of movement in the scene.

This control could be introduced in the television camera, at any suitable point in the path between the camera and the television screen, or in the television receiver.

Control of the sequence of images in accordance with the direction of movement in the scene could also be applied to the other forms of the invention described above, for example those employing modification of the actuation of the imaging elements in the camera.

Control of the sequence of images could be effected by intervention by an operator, or automatically under the control of a computer program using known techniques for detecting and analysing the movement of objects in the scene, or by a combination of the two.

Figure 10:
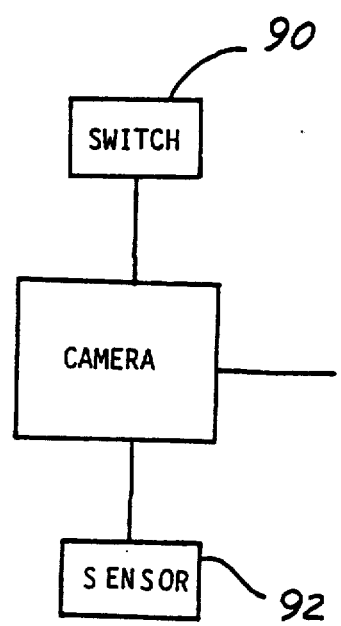
FIG. 10 illustrates diagrammatically a television camera with a manually operated switch and sensor provided in accordance with a further embodiment of the invention.

For example, where control of the colour images is carried out in the camera, a manually operated switch 90 (FIG. 10) could be provided to enable the camera operator to select the sequence of images in accordance with his judgement of the predominant direction of horizontal movement in the scene. Similarly, where the control is introduced at the point of transmission, it could be carried out by an operator monitoring the pictures to be transmitted. Where the control is effected in the television receiver, it would be necessary for the control to be carried out automatically. It would be possible to combine a system of control of the sequence of images in accordance with direction of horizontal movement in the scene with a system for providing information appropriate to both directions of horizontal movement in each frame or each field, as described above with reference to FIGS. 4 to 7. For example, the system could be arranged so as normally to provide both kinds of information in each frame or field, when there is no predominant direction of horizontal movement in the scene, and to switch to providing information only of one kind when there is predominant movement in one direction.

The control could also be combined with other controls, for example, control of the delay between successive images in accordance with the horizontal speed of movement of the principal object in the scene, to control the width of "fringes" generated by movement of the object.

If the camera itself is moved horizontally during recording of a scene, for example in tracking or panning shots, it would be desirable to control the sequence of colour images in accordance with the direction of movement of the camera. This could be done by the camera operator, using the manually operated switch referred to above. Alternatively, it could be carried out automatically, by providing in or attached to the camera a sensor 92 (FIG. 10) for detecting movement of the camera and for controlling the sequence of images in accordance with the movement detected. For example, the sensor could be an inertia switch of known type, set to operate when the speed of movement of the camera in one direction exceeded a threshold value, to supply an electrical signal to the control circuits of the camera. The switch could be set to operate only when the camera is moved in one direction, or be designed to provide different signals depending on the direction of movement, to cause the control circuits to select the appropriate sequence of images. In a further modification, the sensor could be designed to provide a signal dependent on the speed as well as direction of movement of the camera, to control the width of the "fringes" generated by movement of the camera.

We claim:

1. A colour television or video system for processing signals from a television camera, in which a number of different signals corresponding to images of different colours give rise to different colour partial images superimposed on a television screen to form a single full colour image, in which the signals are processed so that the partial images superimposed on the screen correspond to images seen by the camera at times separated by predetermined intervals, so that the partial images of an object moving relative to the camera are displaced relative to one another on the television screen to give a stereoscopic effect when the different images are presented to different eyes of the viewer, characterized in that processing means are provided for processing the signals so that, at least over a number of successive fields, the full colour images on the television screen include images in which the displacement between different colour partial images, or parts thereof, is in a direction appropriate to the predominant horizontal direction of movement in the scene.

2. A system as claimed in claim 1, characterized in that said processing means are adapted to process the signals so that full colour images consisting of partial images displaced relative to another in directions appropriate respectively to movement from left to right and from right to left in the scene are presented alternately on the television screen.

3. A system as claimed in claim 2, in which the said full colour images are presented in alternate fields or alternate frames.

4. A system as claimed in claim 2, in which said processing means comprises digital storage means for storing the signals field by field (or frame by frame) in an appropriate number of stores, and read control means for reading the signals from the stores in an appropriate sequence.

5. A system as claimed in claim 1, in which said processing means are adapted to process the signals so that the image appearing on the television screen is divided into a number of horizontal strips, and so that for each field or frame, the strips include both strips in which the different colour partial images are displaced in a direction appropriate to movement of an object from left to right in the scene and strips in which displacement of the different colour partial images is appropriate to movement from right to left in the scene.

6. A system as claimed in claim 5, in which each strip consists of one or more lines of the television picture.

7. A system as claimed in claim 5, in which said processing means comprises digital stores for storing the signals corresponding to each strip, and read control means for reading the signals from the stores in an appropriate sequence.

8. A system as claimed in claim 1, in which there are provided further control means operable in response to a manual input to set the processing means so that the displacement of the different colour partial images superimposed on the television screens is appropriate to a selected horizontal direction of movement of an object relative to the camera.

9. A system as claimed in claim 1, in which there are provided electronic analyzing means connected to said processing means so as to receive the signals and to analyze the signals to establish the predominant direction of horizontal movement in the scene, and to control the processing means so that the displacement of the different colour partial images is appropriate to the predominant direction of movement.

10. A system as claimed in claim 8, in which displacement control means are provided for controlling the degree of displacement between the different colour partial images in accordance with the horizontal speed of movement of an object in the scene.

11. A system as claimed in claim 6, and including a sensor for connection to said television camera for detecting the direction and/or speed of horizontal movement of the camera and connected to said processing means so as to control the direction and/or degree of displacement of the different colour partial images in accordance with the direction and/or speed of movement detected.

12. A system as claimed in claim 3, in which said processing means comprises digital storage means for storing the signal field by field (or frame by frame) in an appropriate number of stores, and read control means for reading the signals from the stores in an appropriate sequence.

13. A system as claimed in claim 6, in which said processing means comprises digital stores for storing the signals corresponding to each strip, and read control means for reading the signals from the stores in an appropriate sequence.

14. A system as claimed in claim 9, in which displacement control means are provided for controlling the degree of displacement between the different colour partial images in accordance with the horizontal speed of movement of an object in the scene.

15. A system as claimed in claim 7, and including a sensor for connection to said television camera for detecting the direction and/or speed of horizontal movement of the camera and connected to said processing means so as to control the direction and/or degree of displacement of the different colour partial images in accordance with the direction and/or speed of movement detected.

16. A system as claimed in claim 8, and including a sensor for connection to said television camera for detecting the direction and/or speed of horizontal movement of the camera and connected to said processing means so as to control the direction and/or degree of displacement of the different colour partial images in accordance with the direction and/or speed of movement detected.

* * * * *